US006983079B2

(12) United States Patent
Kim

(10) Patent No.: US 6,983,079 B2
(45) Date of Patent: Jan. 3, 2006

(54) REDUCING BLOCKING AND RINGING ARTIFACTS IN LOW-BIT-RATE CODING

(75) Inventor: Changick Kim, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 780 days.

(21) Appl. No.: 10/037,767

(22) Filed: Oct. 23, 2001

(65) Prior Publication Data

US 2003/0053711 A1 Mar. 20, 2003

Related U.S. Application Data

(60) Provisional application No. 60/323,986, filed on Sep. 20, 2001.

(51) Int. Cl.
*G06K 9/40* (2006.01)

(52) U.S. Cl. ..................................... 382/275

(58) Field of Classification Search ................. 382/254, 382/261, 264–275, 232, 260; 358/448, 466
See application file for complete search history.

(56) References Cited

U.S. PATENT DOCUMENTS

| | | | | |
|---|---|---|---|---|
| 5,229,864 A | * | 7/1993 | Moronaga et al. | 382/261 |
| 5,737,451 A | * | 4/1998 | Gandhi et al. | 382/268 |
| 5,883,983 A | | 3/1999 | Lee et al. | 382/268 |
| 5,974,197 A | | 10/1999 | Lee et al. | 382/268 |
| 6,064,776 A | * | 5/2000 | Kikuchi et al. | 382/260 |
| 6,167,164 A | | 12/2000 | Lee | 382/261 |
| 6,226,050 B1 | | 5/2001 | Lee | 348/607 |
| 6,285,801 B1 | | 9/2001 | Mancuso et al. | 382/268 |
| 6,427,031 B1 | * | 7/2002 | Price | 382/264 |
| 6,539,060 B1 | * | 3/2003 | Lee et al. | 375/240.29 |
| 2001/0003545 A1 | | 6/2001 | Hong | 382/268 |
| 2001/0019634 A1 | | 9/2001 | Lainema et al. | 382/268 |

FOREIGN PATENT DOCUMENTS

| | | |
|---|---|---|
| EP | 0585573 A2 * | 7/1993 |
| EP | 1209624 A1 * | 11/2000 |
| WO | WO 00/33254 | 6/2000 |

OTHER PUBLICATIONS

Sampson et al, "A method for enhancing the picture quality of low bit–rate block–coded images", IEEE, Jul. 1995.*
Park et al, "Blocking effect reduction of JPEG images by signal adaptive filtering", IEEE, Feb. 1998.*
Park et al, "A postprocessing method for reducing quantization effects in low bit–rate moving picture coding", IEEE, Feb. 1999.*

* cited by examiner

*Primary Examiner*—Jose L. Couso
*Assistant Examiner*—Tom Y. Lu
(74) *Attorney, Agent, or Firm*—Michael T. Gabrik

(57) ABSTRACT

A technique to reduce blocking and ringing artifacts in low bit-rate block-based video coding is applied to each reconstructed frame output from the decoder. For each pixel block of a reconstructed frame, its DC value and DC values of the surrounding eight neighbor blocks are exploited to predict AC coefficients which might be lost in the quantization stage in the encoding process. The predicted AC coefficients are used to classify each reconstructed block as either a low-activity or a high-activity block. Low-pass filtering is then adaptively applied according to the classification of the block. Strong low-pass filtering is applied in low-activity blocks where the blocking artifacts are most noticeable, whereas weak low-pass filtering is applied in high-activity blocks where ringing noise as well as blocking artifacts may exist. The adaptive filtering reduces ringing noise as well as blocking artifacts without introducing undesired blur. In low activity blocks, the blocking artifacts are reduced by one dimensional horizontal and vertical low-pass filters which are selectively applied in either the horizontal and/or vertical direction depending on the locations and absolute values of the predicted AC coefficients. In high activity blocks, de-blocking and de-ringing is conducted by a single filter, applied horizontally and/or vertically, which makes the architecture simple.

19 Claims, 5 Drawing Sheets

■ Edge pixel in a high-activity block
▨ Pixel to which both vertical and horizontal 3-tab filter is applied
▥ Pixel to which vertical 3-tab filter is applied
▤ Pixel to which horizontal filter is applied

REDUCING BLOCKING AND RINGING ARTIFACTS IN LOW-BIT-RATE CODING

CONTINUATION APPLICATION DATA

Applicant claims priority under 35 U.S.C. § 119(e) on provisional application Ser. No. 60/323,986, filed on Sep. 20, 2001, the content of which is incorporated by reference herein.

BACKGROUND OF THE INVENTION

1. Field of the Invention

This present invention relates to an improved algorithm for smoothing artificial discontinuities between image blocks (blocking artifacts) and reducing ringing noise, without introducing undesired blur. The invention, which can be embodied in an apparatus, methods or programs of instructions, is particularly, though not exclusively, designed for low-bit-rate video coding applications.

2. Description of the Related Art

Today's low-bit-rate video coding standards, MPEG-4 and ITU-T H.263, contain algorithms that enable a variety of applications, including video conferencing and wireless video communications. These standards and the systems that use them take advantage of temporal redundancy as well as spatial redundancy to compress video. While these standards are quite effective in many ways, they sometimes generate decompressed images that exhibit artificial discontinuities between image blocks. These blocking artifacts are caused primarily by quantization during the quantization step of the compression process.

To combat this problem these coding standards have incorporated algorithms for reducing blocking artifacts. In block-based coding, monotone areas of the original image, where the pixel intensity changes gradually, suffer most noticeably from the abrupt changes across the block boundary, leading to blocking artifacts. In terms of discrete cosine transform (DCT), when the DCT coefficient quantization step size is above the threshold for visibility, discontinuities in grayscale values are caused by removal of AC coefficients due to quantization and become clearly visible at the boundaries between blocks. Also, visually annoying noise near real edges, which is called ringing noise, is inevitable in the block-based DCT scheme. In applications using low bit-rate coded video sources, such blocking and ringing artifacts cause substantial practical problems, and therefore must be reduced. Various deblocking schemes have been proposed in still image coding such as JPEG under the assumption that blocking artifacts are always located at block boundaries. A well-known method for reducing blocking artifacts is based on the theory of alternative projection onto convex sets (POCS). However, this method is only applied to still images because of an iteration structure and long convergence time.

In video coding, unlike still image coding, blocking artifacts might occur inside a block since the blocking artifacts of the previous frame can be propagated to the current frame. Recently, post-filtering methods for low bit-rate coded video have been proposed. For example, an adaptive filtering scheme has been proposed based on local characteristics to reduce blocking artifacts. In another proposal a frequency-domain analysis is conducted for extraction of the block semaphores from the intracoded picture. The semaphores extracted are propagated using inverse motion compensation for inter-frame de-blocking and de-ringing. While these techniques are generally acceptable, further improvements, especially in the areas of increased speed and reduced computational complexity, are desirable.

OBJECTS AND SUMMARY OF THE INVENTION

Objects of the Invention

A main object of the present invention is to provide an improved technique, having low computational complexity and high speed, for reducing blocking and ringing artifacts from still images or video frames based on local characteristics.

It is another object of this invention to provide an improved technique for reducing blocking and ringing artifacts which employs block-based adaptive filtering based on block classification and certain characteristics of the corresponding predicted transform coefficients.

SUMMARY OF THE INVENTION

According to one aspect of this invention, a method for reducing artifacts in digital data is provided. Such method comprises the steps of: (a) obtaining a reconstructed block-based pixel representation of the digital data; (b) extracting a DC coefficient for each block in the pixel representation based on values of selected pixels in that block to generate a map of DC coefficients; (c) for each pixel block, predicting a select number of lower frequency AC coefficients using the DC coefficient for that pixel block and a select number of neighboring DC coefficients in the DC coefficient map to construct a corresponding partial transform-coefficient block; (d) classifying each pixel block based on the predicted AC coefficients in the corresponding partial transform-coefficient block; and (e) selectively performing a low-pass filtering operation on select pixels in select pixel blocks on a block-by-block basis based on the classification of that block, the locations and values of predicted non-zero AC coefficients in the corresponding partial transform block, and certain pixel values in that block.

The following additional features may also be included in the above-described method.

In step (c), the five lowest frequency AC coefficients are predicted for each pixel block.

In step (d), the classifying of each pixel block comprises comparing the absolute sum of the predicted AC coefficients in the corresponding partial transform block to a threshold.

In step (d), a particular pixel block is classified as a low-activity block if the absolute sum of the predicted AC coefficients in the corresponding partial transform-coefficient block is less than the threshold, and, if not, the particular pixel block is classified as a high-activity block.

Step (e) comprises applying a strong low-pass filter to boundary region pixels in select low-activity blocks and applying a weak low-pass filter to pixels in select high-activity blocks.

For each low-activity block, the strong low-pass filter is applied to: smooth boundary region pixels in both the horizontal and vertical directions if all of the predicted AC coefficients in the corresponding partial transform-coefficient block have absolute values less than a predetermined value; smooth boundary region pixels in the vertical direction if at least one AC coefficient in a first select location in the corresponding partial transform-coefficient block has an absolute value greater than or equal to the predetermined value; and smooth boundary region pixels in the horizontal direction if at least one AC coefficient in a second location in the corresponding partial transform-coefficient block has an absolute value greater than or equal to the predetermined value.

For each low-activity block, the strong low-pass filter is applied to a current boundary region pixel only when a difference between a maximum pixel value and a minimum pixel value among a predetermined number of pixels centered on the current boundary region pixel is less than a predetermined parameter. This prevents real edges which may exist in a low-activity block due to an incorrect classification decision from being blurred by application of a strong low-pass filter.

For each high-activity block, the weak low-pass filter is applied to smooth pixels inside the block in the horizontal direction if a difference between values of a first two adjacent pixels and a difference between values of a second two adjacent pixels are both less than a predetermined parameter and is applied to smooth pixels inside the block in the vertical direction if a difference between values of a third two adjacent pixels and a difference between values of a fourth two adjacent pixels are both less than the predetermined parameter.

In another aspect, the invention involves an apparatus for reducing artifacts in digital data. Such apparatus comprises: a DC-coefficient-map generator that receives a reconstructed block-based pixel representation of the digital data and extracts a DC coefficient for each block in the pixel representation based on values of selected pixels in that block to generate a map of DC coefficients; an AC coefficient predictor that, for each pixel block, predicts a select number of lower frequency AC coefficients using the extracted DC coefficient for that pixel block and a select number of neighboring DC coefficients in the DC coefficient map to construct a corresponding partial transform-coefficient block; a block classifier that classifies each pixel block based on the predicted AC coefficients in the corresponding partial transform-coefficient block; and an adaptive filtering unit that selectively performs a low-pass filtering operation on select pixels in select pixel blocks on a block-by-block basis based on the classification of that block, the locations and values of predicted non-zero AC coefficients in the corresponding partial transform block, and certain pixel values in that block.

Preferably, the block classifier classifies a particular pixel block as a low-activity block if the absolute sum of the predicted AC coefficients in the corresponding partial transform-coefficient block is less than the threshold, and, if not, classifies the particular pixel block as a high-activity block.

Preferably, the adaptive filtering unit comprises a strong low-pass filter that is applied to boundary region pixels in select low-activity blocks, and a weak low-pass filter that is applied to pixels in select high-activity blocks.

In accordance with further aspects of the invention, any of the above-described methods or steps thereof may be embodied in a program of instructions (e.g., software) which may be stored on, or conveyed to, a computer or other processor-controlled device for execution. Alternatively, any of the methods or steps thereof may be implemented using functionally equivalent hardware (e.g., application specific integrated circuit (ASIC), digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

A. Overview

Figure 1:
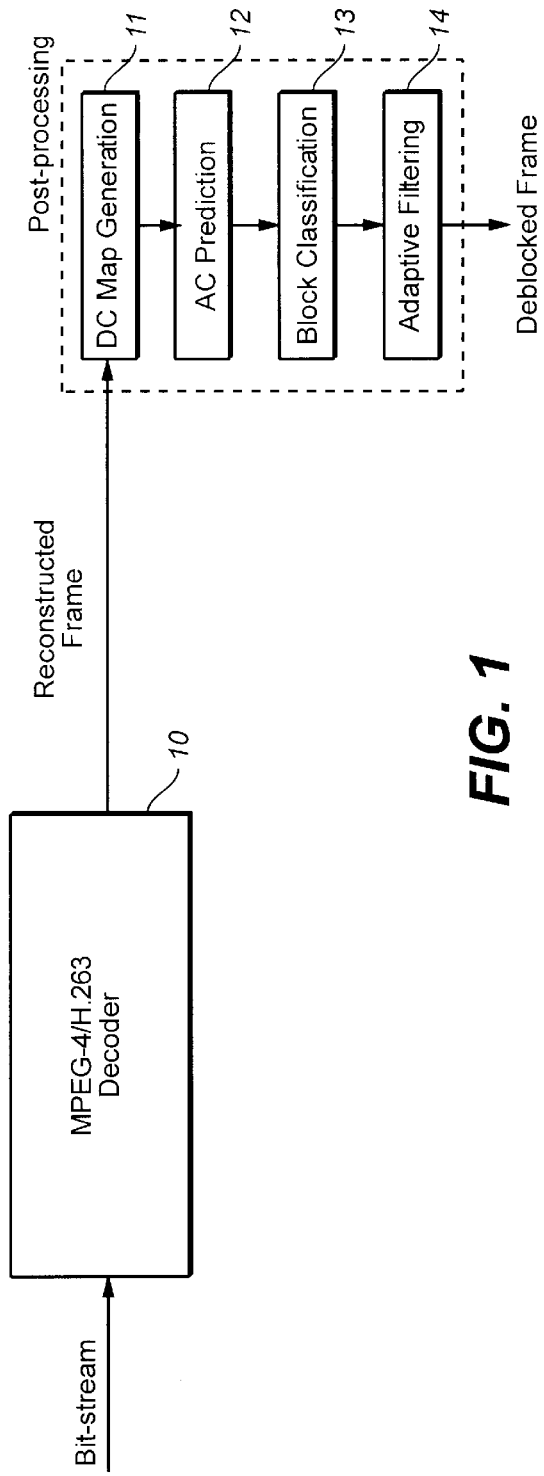
FIG. 1 is a block diagram illustrating the processing pipeline in accordance with embodiments of the present invention.

The present invention provides a technique (e.g., an algorithm) to reduce blocking and ringing artifacts in low bit-rate block-based coding, and is particularly applicable to such video coding. Generally, for each reconstructed frame block (i.e., a pixel block), the algorithm estimates its DC frequency coefficient and predicts certain AC frequency coefficients, classifies each block based on the predicted AC coefficients, and adaptively filters select block regions based on the block classification to reduce blocking and ringing artifacts. As illustrated in FIG. 1, the technique is applied to each reconstructed frame output from a decoder 10.

First a map of the DC frequency coefficients is generated (block 11). The DC value of each reconstructed block in the map is determined by sampling the pixel values at 8 out of 64 locations in the block. From this DC coefficient map, each DC value and the eight surrounding DC values in the map are exploited to predict the five lowest frequency AC coefficients (block 12) which might be lost in the quantization stage of the encoding process.

It should be noted that the sampling of 12.5% of the pixels in a block (e.g., 8 out of 64 pixels in a JPEG or MPEG scheme) is a preferred way of determining the block's DC coefficient; however, it is not the only way. Other reasonable variations of sub-sampling may be employed, such as sampling anywhere between 10% and 20%, recognizing the trade off between accuracy and computational complexity. Likewise, other reasonable variations may be employed in terms of the number of AC coefficients predicted and the DC coefficients used to make the prediction. For example, instead of using all eight surrounding DC coefficients in the DC coefficient map, a lesser number may be used. Also, the number of AC coefficients may be slightly more or less than five. Again, the trade off is one of accuracy vs. computational complexity. Such variations will be apparent to one skilled in the art in light of the disclosure herein.

The predicted AC coefficients are used to classify each reconstructed block as either a low- or high-activity block (block 13). A "low-activity block" is a block (typically 8×8) wherein the spatial standard deviation is small. A "high-activity block" is a block (typically 8×8) wherein there is at least one real edge; thus the spatial standard deviation is large.

Next, two kinds of low-pass filters (LPF) are adaptively applied, on a block-by-block basis, according to the classification of the particular block (block 14). A strong LPF is applied to boundary region pixels in low-activity blocks where the blocking artifacts are most noticeable, whereas a weak LPF is applied to pixels in high-activity blocks. The adaptive filtering is designed to reduce ringing noise as well as blocking artifacts without introducing undesired blur. In low-activity-block filtering, the blocking artifacts are reduced by one dimensional horizontal and vertical LPFs, which are selectively applied in the horizontal and/or vertical direction depending on the locations and absolute values of the predicted AC coefficients. In high-activity-block filtering, de-blocking and de-ringing is achieved by a single filter, applied horizontally and/or vertically, which makes the invented architecture simple.

B. Algorithm

Blocking artifacts occurring in still image coding such as JPEG originate from the quantization of DCT coefficients in the encoding process. In the JPEG standard, a technique for predicting the AC coefficients is recommended in Annex-K8.2 as an option for the decoder in order to suppress between-block discontinuities of the decoded image. In this approach, the image is assumed to be a quadratic surface, and the missing low frequency coefficients are predicted to fit this surface. However, in areas with sharp intensity transitions, this model may fail to provide accurate AC coefficients. Nevertheless, the inventor of this invention has observed that this AC prediction scheme provides useful information that may be used to classify blocks and apply low-pass filters adaptively according to the predicted AC coefficient values.

Accordingly, the present invention classifies blocks and allows for adaptive selection of the strength and direction of filtering. Thus, unlike previous methods that require edge detection, the algorithm of this invention does not need to compute edge information and apply an LPF adaptively based on the edges. The present invention comprises three primary functional blocks, i.e., AC coefficients prediction, block classification, and adaptive filtering depending on block classification results. Each of these functional blocks is described below in connection with a preferred embodiment of the invention. As previously noted, other variations are possible.

B.1 AC Coefficients Prediction and Block Classification

Initially, DC coefficient values are extracted from the reconstructed frame blocks to generate a map of DC coefficients. To reduce computational load, the DC value of each block is calculated by sampling the pixel values at 8 out of 64 locations in that block. The generated DC coefficient map has a reduced size by a factor of 8 (i.e., 22×18 in case of QCIF), requiring little additional memory. (QCIF stands for Quarter Common Intermediate Format, which is a video format defined in ITU-T Recommendation H.261 and characterized by 176 luminance pixels on each of 144 lines, with half as many chrominance pixels in each direction.) In the illustrated embodiment, each DC value is 8 times the approximation of the mean value of its corresponding reconstructed block.

Figure 2C:
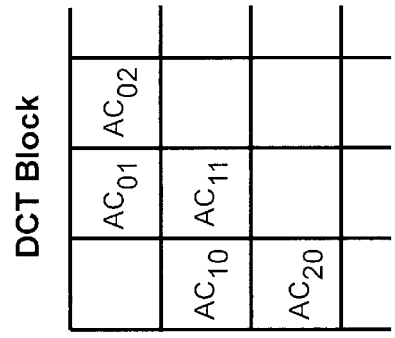
FIGS. 2(a), 2(b) and 2(c) are schematic diagrams illustrating DC coefficients extraction, DC coefficient map generation and AC coefficient prediction.
Figure 2B:
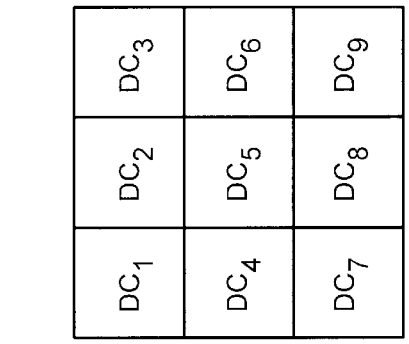
Figure 2A:
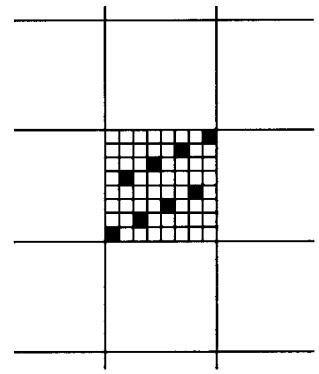

The process of generating a map of DC coefficients is schematically illustrated in FIGS. 2(a) and 2(b). FIG. 2(a) shows a 3×3 array of reconstructed blocks, one of which (e.g., the middle one) is further divided into an 8×8 array of pixels. The DC value for each block is extracted by sampling the values of the 8 darkened pixels in that block to produce the corresponding value in the 3×3 DC coefficient map shown in FIG. 2(b). The sampling of the middle reconstructed block produces $DC_5$ in the DC coefficient map. The other DC coefficients are produced by sampling pixel values in their respective reconstructed blocks.

After the DC coefficient map is generated from the reconstructed frame, the DC value of the current block and its surrounding eight neighbor DC values are exploited to predict the five lowest-frequency AC coefficients of the corresponding DCT block, as schematically illustrated in FIG. 2(c), and more fully explained below.

A quadratic surface, given by $$P(x,y)=A_1x^2y^2+A_2x^2y+A_3xy^2+A_4x^2+A_5xy+A_6y^2+A_7x+A_8y+A_9 \quad (1)$$

is fitted to the 3×3 array of DC values, and is used to estimate the five lowest-frequency AC coefficients of the 8×8 pixel array in the central block. The coefficients $A_1 \ldots A_9$ are determined by requiring that the mean values computed for the quadratic surface match the DC values, $DC_1 \ldots DC_9$, with appropriate scaling for the DCT normalization.

If a DCT is computed for the central block, the result is a set of equations relating the AC coefficients required to reproduce the quadratic surface to the DC coefficients which predict the quadratic surface. In one embodiment, the equations for the first five coefficients in the zigzag scan are:

$$AC_{01}=(1.13885/8)(DC_4-DC_6)$$
$$AC_{10}=(1.13885/8)(DC_2-DC_8)$$
$$AC_{20}=(0.27881/8)(DC_2+DC_8-2DC_5) \quad (2)$$
$$AC_{11}=(0.16213/8)((DC_1-DC_3)-(DC_7-DC_9))$$
$$AC_{02}=(0.27881/8)(DC_4+DC_6-2DC_5).$$

The subscripts of the AC coefficients indicate the horizontal and vertical positions of the coefficient in the DCT array (see FIG. 2(c)). These equations predict the unquantized AC coefficients from the unquantized DC values. The original block activity can be expressed by the absolute sum of the predicted AC coefficients, since the sum is approximated by the standard deviation of the block which can be described as follows.

Consider an image f which has K blocks, each of size N×N. A pixel value at $(i,j)$, $0 \leq i,j \leq N-1$, in the kth block, $1 \leq k \leq K$, is denoted by $f_k(i,j)$ where the blocks are numbered sequentially from 1 beginning at the top left to the bottom right in a raster-scan order. The kth block of the image, $f_k(i,j), 0 \leq i,j \leq N-1$, is transformed to $F_k(u,v)$, $0 \leq u,v \leq N-1$, where $(i,j)$ and $(u,v)$ are coordinate indexes, respectively, in the spatial and transform domains.

In the spatial domain, the mean variance can be used to determine the characteristics of the original kth block, where the mean variance is expressed by $$\sigma_k^2 = \sum_{i=0}^{N-1}\sum_{j=0}^{N-1}(f_k(i,j)-\mu_k)^2$$

and $\mu_k$ is the mean of $f_k$. From Parseval's energy theorem, the mean variance can be exactly calculated from the sum of square of the ac components, i.e., $$\sigma_k^2 = \frac{1}{N^2}\left(\sum_{u=0}^{N-1}\sum_{v=0}^{N-1}F_k(u,v)^2 - F_k(0,0)^2\right).$$

Define $\hat{F}_k(u,v)$ is a predicted coefficient of $F_k(u,v)$ by unknown prediction method. If $\hat{F}_k(u,v)$ is obtainable from the decoding stage, the estimated mean variance of the original block, $$\hat{\sigma}_k^2 = \frac{1}{N^2} \left( \sum_{u=0}^{N-1} \sum_{v=0}^{N-1} \hat{F}_k(u, v)^2 - \hat{F}_k(0, 0)^2 \right) \quad (\text{5})$$

can be calculated. To reduce computation, the estimated standard deviation is approximated by the mean absolute values as $$\hat{\sigma}_k = \frac{1}{N} \left( \sum_{u=0}^{N-1} \sum_{v=0}^{N-1} |\hat{F}_k(u, v)| - |\hat{F}_k(0, 0)| \right). \quad (3)$$

Ignoring high frequency coefficients except the five lowest AC coefficients predicted from Eq. (2), the standard deviation expressed in Eq. (3) is approximated as $$\hat{\sigma}_k = \frac{1}{N} (|F_k(0, 1)| + |F_k(1, 0)| + \\ |F_k(2, 0)| + |F_k(1, 1)| + |F_k(0, 2)|). \quad (4)$$

Thus, by replacing notations and ignoring scaling factor, the block activity of the kth block is defined as $$ACT_k = |AC_{01}| + |AC_{10}| + |AC_{20}| + |AC_{11}| + |AC_{02}|. \quad (5)$$

Since the standard deviation in each of the low-activity blocks has a small absolute value, the equation below is used to classify the block characteristics.

$$\{\text{if}(|AC_{01}| + |AC_{10}| + |AC_{20}| + |AC_{11}| + |AC_{02}| < \theta), \text{low-activity block} \\ \text{otherwise, high-activity block} \quad (6)$$

If the absolute sum of the predicted AC coefficients is smaller than a preset threshold θ, the corresponding reconstructed block is deemed to be a low-activity block. Otherwise, that reconstructed block is considered to be a high-activity block. The threshold value may be determined by simulations for various video sequences. In one embodiment, the threshold θ may be set to, for example, 400.

B.2 Adaptive Filtering Using Classification Results

In this stage, adaptive low-pass filtering is performed on certain reconstructed blocks, on a block-by-block basis, depending on block classification, the locations of the predicted non-zero AC coefficients, and certain pixel values, as described below.

For the low-activity blocks, a one-dimensional (1-D) strong (e.g., 7-tab) LPF is applied to boundary region pixels, along all of the horizontal and vertical edges. The predicted AC coefficients can also be exploited for selective application of horizontal and/or vertical strong LPFs depending on the locations and absolute values of the predicted AC coefficients. Such coefficients reflect spatial activity of the original block and are assumed to be the unquantized coefficients of the intra-coded blocks. Since the quantization formula used for intra-coded blocks is:

$$Q(coeff) = \text{sign}(coeff) \times \left( \frac{|coeff|}{2QP} \right)$$

where $$\text{sign}(coeff) = \begin{cases} -1, & coeff < 0 \\ 0, & coeff = 0 \\ +1, & coeff > 0 \end{cases}$$

and QP is a quantization parameter that is determined in the encoding stage by the user, the blocks which have predicted coefficients whose absolute values are less than 2×QP are expected to have blocking artifacts in the decoded frame.

In one embodiment, for each low-activity block, three situations are considered for strong low-pass filtering. When all of the predicted AC coefficients have absolute values less than 2×QP, it is assumed that the 64 pixels of the 8×8 decoded block have the same values in the spatial domain; therefore, such a block is a candidate for having a strong LPF applied to it in both the horizontal and vertical directions. When only the predicted coefficients for position $AC_{01}$ and/or position $AC_{02}$ of the 8×8 inverse quantized block have absolute values greater than or equal to 2×QP, it is expected that the eight pixels in each column have the same value in the spatial domain, while there exists fluctuation along each row. This block may induce blocking artifacts at the top and the bottom of the block, and hence is a candidate for having a strong LPF applied to it in the vertical direction. When only the predicted coefficients for position $AC_{10}$ and/or position $AC_{20}$ have absolute values greater than or equal to 2×QP, it is expected that the eight pixels in each row have the same values in the spatial domain, while there exists fluctuation along each column. This block may induce blocking artifacts at the left and the right of the block, and hence is a candidate for having a strong LPF applied to it in the horizontal direction.

Figure 3B:
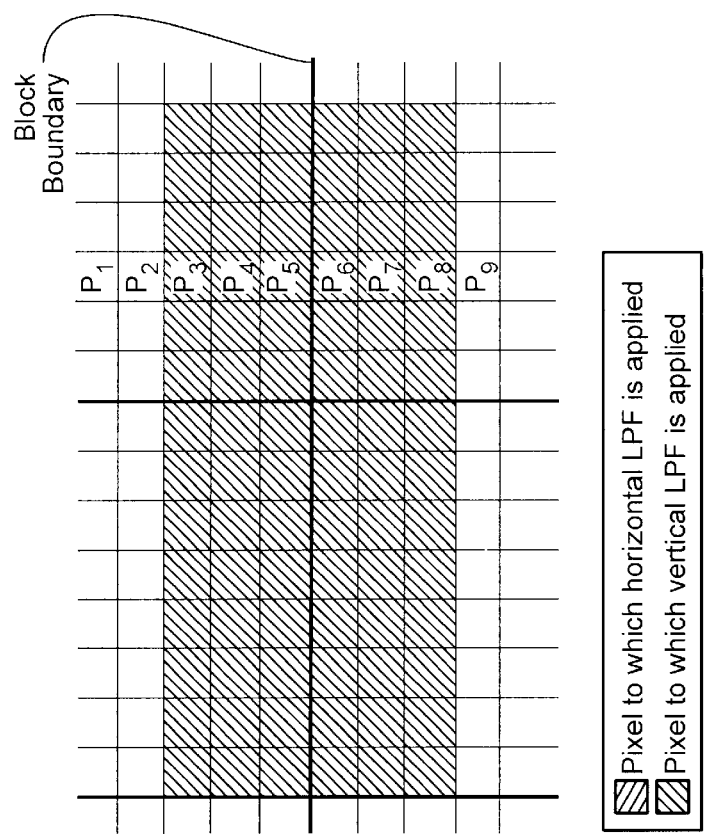
FIGS. 3(a) and 3(b) are schematic diagrams illustrating the pixel locations to which strong low-pass filters are applied in low-activity blocks.
Figure 3A:
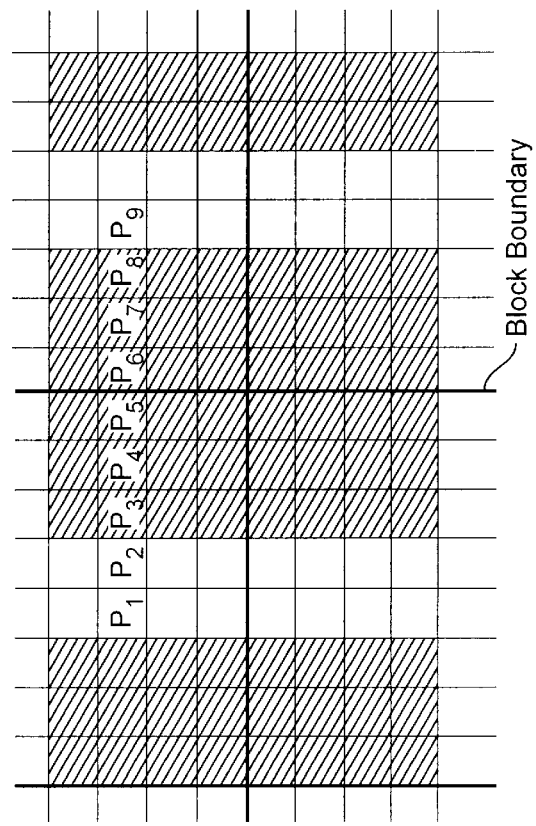

The coefficients of such a strong LPF are preferably as follows:

$$h(n) = \frac{1}{8} \{1, 1, 1, 2, 1, 1, 1\} \quad (7)$$

and filtering is performed, subject to the below-described condition, on boundary region pixels, that is, three rows/columns of pixels on either side of the block boundary. FIGS. 3(a) and 3(b) show the pixel locations to which the horizontal and vertical LPFs are respectively applied in low-activity blocks. Sometimes a block containing real edges may be classified as a low-activity block, which may occur when the DC value of the block is very similar to those of neighbor blocks. Thus, to prevent real edges in the low-activity-classified block from being smoothed, the above-described low-activity-block filtering scheme is subject to the following condition. Specifically, filtering is not performed when the difference between the maximum pixel value and the minimum pixel value among nine pixels centered on the current pixel is greater than QP. For instance, pixel $P_5$ shown in FIG. 3(a) is not low-pass filtered if max(P)−min(P)>QP, where P={$P_1, P_2, \ldots, P_8, P_9$}.

Figure 4:
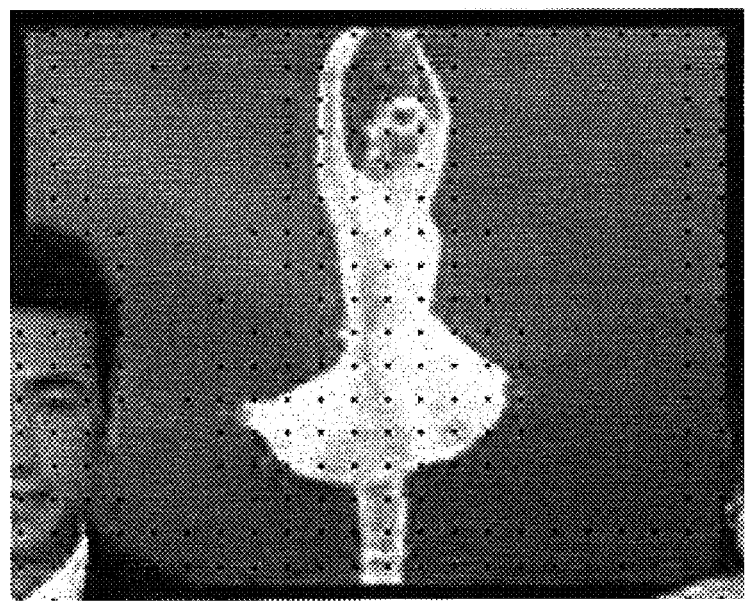
FIG. 4 is an image with recognized high-activity blocks marked.

Unlike low-activity areas, high-activity areas may have visually annoying ringing artifacts as well as blocking artifacts. FIG. 4 shows an image with recognized high-activity blocks marked. The ringing noise occurs as a result of the Gibb's phenomenon due to truncation of the high frequency coefficients by quantization, which is noticeable near the real edges which correspond to high-activity areas. Thus, the filtering in the high-activity areas needs to reduce ringing noise as well as blocking artifacts, but without smoothing real edges. A weak (e.g., 3-tab) LPF is chosen for this task. The filter coefficients are preferably as follows:

$$h(n) = \frac{1}{4} \{1, 2, 1\} \quad (8)$$

Figure 5:
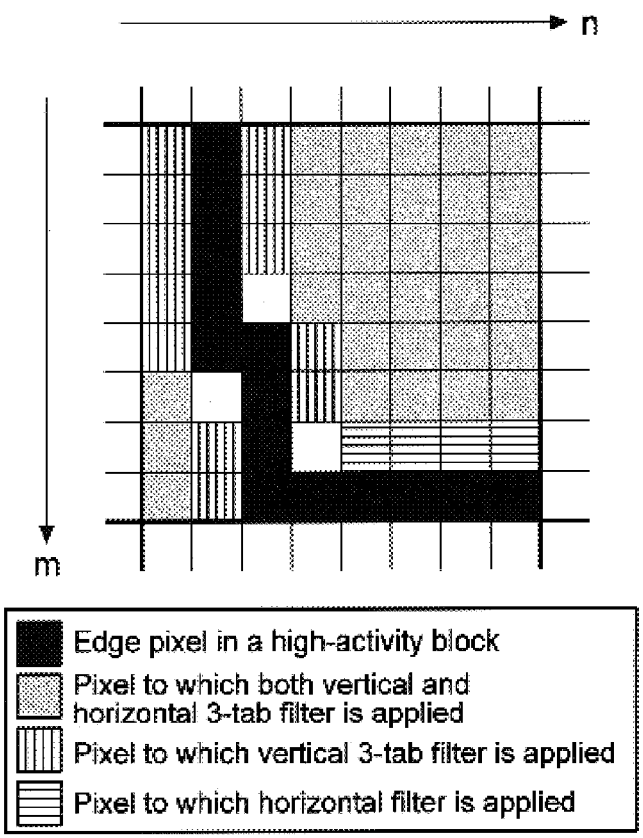
FIG. 5 is a schematic diagram illustrating the pixel locations to which weak low-pass filters are applied in high-activity blocks.

Horizontal and/or vertical filtering is performed on pixels in the high-activity as long as the difference between adjacent pixels values under the filter is less than 1.5×QP. In other words, if a pixel difference is greater than 1.5×QP, it is assumed that there is an edge point in three pixels and filtering is not performed. FIG. 5 schematically illustrates the pixel positions to which the horizontal and/or vertical 3-tab filters are applied. This filtering process can be summarized as follows:

if ((A1<1.5*QP) and (A2<1.5*QP)), apply horizontal filtering, if ((B1<1.5*QP) and (B2<1.5*QP)), apply vertical filtering, where $A1=|\text{pixel}[m][n]-\text{pixel}[m][n-1]|$ $A2=|\text{pixel}[m][n]-\text{pixel}[m][n+1]|$ $B1=|\text{pixel}[m][n]-\text{pixel}[m-1][n]|$ $B2=|\text{pixel}[m][n]-\text{pixel}[m+1][n]|$ This filter applied to block boundaries reduces the blocking artifacts and reduces ringing noise as well inside the block. This filtering scheme efficiently performs de-ringing as well as weak filtering in the high-activity blocks.

Figure 6:
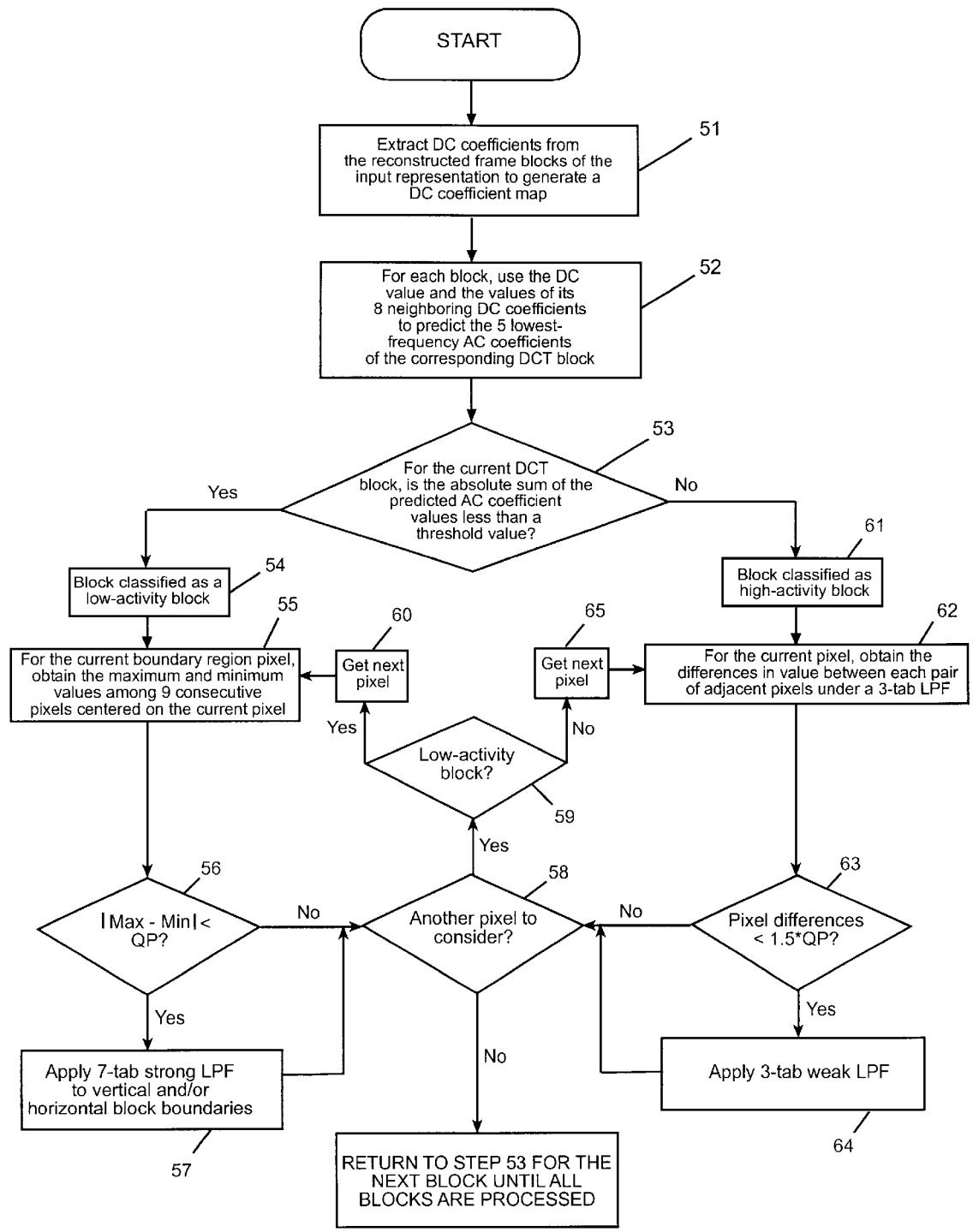
FIG. 6 is a flow chart illustrating certain process steps of the algorithm in accordance with embodiments of the invention.

A flow chart, shown in FIG. 6, summarizes the algorithm in accordance with embodiments of the invention. After the algorithm starts, the DC coefficients of the reconstructed frame blocks of the digital input representation are extracted to generate a DC coefficient map (step 51). Next, in step 52, for each block in the map, the DC value and its surrounding eight neighbor DC values are used to predict the five lowest-frequency AC coefficients of the corresponding DCT block.

Next, adaptive low-pass filtering is applied to certain pixels of each reconstructed frame block on a block-by-block basis using the values of the extracted DC coefficient and the five predicted AC coefficients from the corresponding DCT block. Thus, the following steps of the algorithm are applied to each reconstructed frame block until all blocks have been processed.

For the current DCT block, it is determined in step 53 whether or not the absolute sum of the predicted AC coefficients is less than a threshold value. If so, the algorithm proceeds to step 54 where the corresponding reconstructed frame block is classified as a low-activity block. For the current boundary region pixel, the maximum pixel value and the minimum pixel value among nine consecutive pixels centered on the current pixel are obtained in step 55. If it is determined in step 56 that the absolute value of the difference between the maximum and minimum values is less than QP, then a 7-tab strong LPF is applied to boundary region pixels around the horizontal and/or vertical block boundaries in this low-activity block in step 57, depending on the location and absolute values of predicted AC coefficients, as previously described, after which the algorithm determines whether there is another pixel to consider (step 58). If so, the algorithm proceeds through the "yes" terminal of decision block 59, obtains the next pixel in step 60 and then returns to step 55 for the newly obtained pixel. If the decision in step 56 is "no," the algorithm proceeds directly to step 58. If it determined at that step that there is not another pixel to consider in the current reconstructed block, the algorithm returns to step 53 for the next DCT block and corresponding reconstructed block until all such blocks have been processed, after which the algorithm ends.

Returning to decision step 53, if the absolute sum of the predicted AC coefficients is not less than the threshold value, then the algorithm proceeds to step 61 where the corresponding reconstructed frame block is classified as a high-activity block.

For the current pixel in the high-activity block, the value differences between each pair of adjacent pixels under the 3-tab LPF are determined in step 62. If it is determined in step 63 that the pixel differences are all less than 1.5*QP, then a 3-tab weak LPF is applied to the current pixel in this high-activity block in step 64, as previously described, after which the algorithm determines whether there are any more "unprocessed" pixels in the block (step 58). If so, the algorithm proceeds through the "no" terminal of decision block 59, obtains the next pixel in step 65 and then returns to step 62 for the newly obtained pixel. If the decision in step 63 is "no," the algorithm proceeds directly to step 58. If it determined at that step that there is not another pixel to consider in the current reconstructed block, the algorithm returns to step 53 for the next DCT block and corresponding reconstructed block until all such blocks have been processed, after which the algorithm ends.

C. Effects and Implementations

As the foregoing description demonstrates, the present invention provides a fast and computationally efficient de-blocking and de-ringing algorithm that is particularly applicable to low-bit-rate block-based video coding. The algorithm is robust to different images and compression schemes. Moreover, because of its relatively simple architecture, the algorithm can be implemented in real-time applications such mobile video phone systems. The algorithm may be conveniently embodied in the form of software that can be used with an existing coding scheme, such as MPEG-4 and ITU-T H.263.

Figure 7:
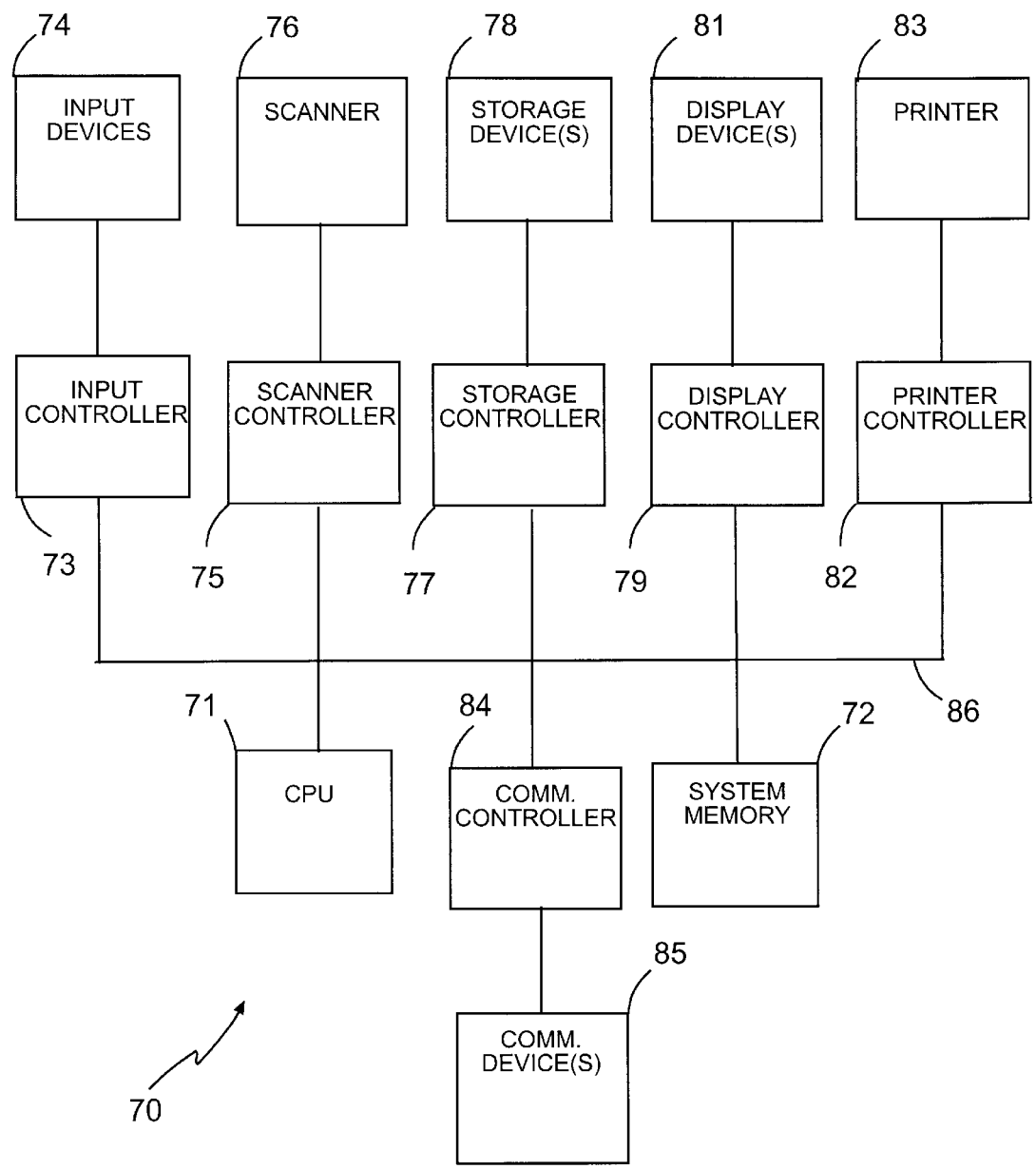
FIG. 7 is a block diagram illustrating components in an exemplary image processing system that may be used to implement aspects of the present invention.

FIG. 7 illustrates a typical system which may be used to "run" the de-blocking and de-ringing algorithm of the present invention. As illustrated in FIG. 7, system 70 includes a central processing unit (CPU) 71 that provides computing resources and controls the computer. CPU 71 may be implemented with a microprocessor or the like, and may also include a graphics processor and/or a floating point coprocessor for mathematical computations. System 70 further includes system memory 72 which may be in the form of random-access memory (RAM) and read-only memory (ROM).

A number of controllers and peripheral devices are also provided, as shown in FIG. 7. Input controller 73 represents an interface to one or more input devices 74, such as a keyboard, mouse, stylus or remote control. There is also a controller 75 which communicates with a scanner 76 or equivalent device for digitizing documents including images to be processed in accordance with the invention. A storage controller 77 interfaces with one or more storage devices 78 each of which includes a storage medium such as magnetic tape or disk, or an optical medium that may be used to record programs of instructions for operating systems, utilities and applications which may include embodiments of programs that implement various aspects of the present invention. Storage device(s) 78 may also be used to store data to be processed in accordance with the invention. A display controller 79 provides an interface to a display device 81 which may be a cathode ray tube (CRT), thin film transistor (TFT)

display, or video player. A printer controller 82 is also provided for communicating with a printer 83 for printing documents including images processed in accordance with the invention. A communications controller 84 interfaces with a communication device 85 which enables system 70 to connect to remote devices through any of a variety of networks including the Internet, a local area network (LAN), a wide area network (WAN), or through any suitable electromagnetic carrier signals including infrared signals.

In the illustrated embodiment, all major system components connect to bus 86 which may represent more than one physical bus. However, it should be noted that while all system components may typically be located in physical proximity to one another, such is not a requirement of the invention. For example, the input data (e.g., reconstructed frame(s)) and/or the output data (e.g., de-blocked/de-ringed frame(s)) may be remotely transmitted from one physical location to another. Also, programs that implement various aspects of this invention may be accessed from a remote location (e.g., a server) over a network. Such data and/or programs may be conveyed through any of a variety of machine-readable medium including magnetic tape or disk or optical disc, network signals, or other suitable electromagnetic carrier signals including infrared signals.

While the present invention may be conveniently implemented with software, a hardware implementation or combined hardware/software implementation is also possible. A hardware implementation may be realized, for example, using ASIC(s), digital signal processing circuitry, or the like. For example, a single ASIC can be fabricated that contains the appropriate hardware for performing the functions depicted in blocks 11–14 of FIG. 1. The term "apparatus" in the claims is intended to cover all such hardware implementations of the invention, as well as other super-set devices, such as a computer or a system of the type shown in FIG. 7, which embody the claimed elements in either hardware or software form.

With these implementation alternatives in mind, it is to be understood that the block and flow diagrams show the performance of certain specified functions and relationships thereof. The boundaries of these functional blocks have been defined herein for convenience of description. Alternate boundaries may be defined so long as the specified functions are performed and relationships therebetween are appropriately maintained. The diagrams and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for reducing artifacts in digital data, comprising the steps of:
   (a) obtaining a reconstructed block-based pixel representation of the digital data;
   (b) extracting a DC coefficient for each block in the pixel representation based on values of selected pixels in that block to generate a map of DC coefficients;
   (c) for each pixel block, predicting a select number of lower frequency AC coefficients using the DC coefficient for that pixel block and a select number of neighboring DC coefficients in the DC coefficient map to construct a corresponding partial transform-coefficient block;
   (d) classifying each pixel block as a low-activity block or a high-activity block based on the predicted AC coefficients in the corresponding partial transform-coefficient block; and
   (e) selectively performing a low-pass filtering operation on select pixels in select pixel blocks on a block-by-block basis based on the classification of that block, the locations and values of predicted non-zero AC coefficients in the corresponding partial transform block, and certain pixel values in that block, wherein a low-pass filter of a first strength is applied to a given pixel region in a given low-activity block if a minimum condition for that pixel region is satisfied, and wherein a low-pass filter of a second strength is applied to a given pixel region in a given high-activity block if a minimum condition for that pixel region is satisfied.

2. The method of claim 1, wherein, in step (c), the five lowest frequency AC coefficients are predicted for each pixel block.

3. The method of claim 1, wherein the classifying of each pixel block in step (d) comprises comparing the absolute sum of the predicted AC coefficients in the corresponding partial transform block to a threshold.

4. The method of claim 3, wherein, in step (d), a particular pixel block is classified as a low-activity block if the absolute sum of the predicted AC coefficients in the corresponding partial transform-coefficient block is less than the threshold, and, if not, the particular pixel block is classified as a high-activity block.

5. The method of claim 4, wherein, in step (e), the low-pass filter of the first strength comprises a strong low-pass filter, and the given pixel region in a given low-activity pixel block to which the strong low-pass filter is applied if a minimum condition for that pixel region is satisfied is boundary region pixels; and the low-pass filter of the second strength comprises a weak low-pass filter.

6. The method of claim 5, wherein, for each low-activity block, the strong low-pass filter is applied to
   smooth boundary region pixels in both the horizontal and vertical directions if all of the predicted AC coefficients in the corresponding partial transform-coefficient block have absolute values less than a predetermined value;
   smooth boundary region pixels in the vertical direction if at least one AC coefficient in a first select location in the corresponding partial transform-coefficient block has an absolute value greater than or equal to the predetermined value; and
   smooth boundary region pixels in the horizontal direction if at least one AC coefficient in a second location in the corresponding partial transform-coefficient block has an absolute value greater than or equal to the predetermined value.

7. The method of claim 6, wherein, for each low-activity block, the strong low-pass filter is applied to a current boundary region pixel only when a difference between a maximum pixel value and a minimum pixel value among a predetermined number of pixels centered on the current boundary region pixel is less than a predetermined parameter.

8. The method of claim 5, wherein, for each high-activity block, the weak low-pass filter is applied to smooth pixels inside the block in the horizontal direction if a difference between values of a first two adjacent pixels and a difference between values of a second two adjacent pixels are both less than a predetermined parameter and is applied to smooth pixels inside the block in the vertical direction if a difference between values of a third two adjacent pixels and a difference between values of a fourth two adjacent pixels are both less than the predetermined parameter.

9. An apparatus for reducing artifacts in digital data, the apparatus comprising:
- a DC-coefficient-map generator that receives a reconstructed block-based pixel representation of the digital data and extracts a DC coefficient for each block in the pixel representation based on values of selected pixels in that block to generate a map of DC coefficients;
- an AC coefficient predictor that, for each pixel block, predicts a select number of lower frequency AC coefficients using the extracted DC coefficient for that pixel block and a select number of neighboring DC coefficients in the DC coefficient map to construct a corresponding partial transform-coefficient block; a block classifier that classifies each pixel block as a low-activity block or a hih-activity block based on the predicted AC coefficients in the corresponding partial transform-coefficient block; and
- an adaptive filtering unit that selectively performs a low-pass filtering operation on select pixels in select pixel blocks on a block-by-block basis based on the classification of that block, the locations and values of predicted non-zero AC coefficients in the corresponding partial transform block, and certain pixel values in that block, wherein a low-pass filter of a first strength is applied to a given pixel region in a given low-activity block if a minimum condition for that pixel region is satisfied, and wherein a low-pass filter of a second strength is applied to a given pixel region in a given high-activity block if a minimum condition for that pixel region is satisfied.

10. The apparatus of claim 9, wherein the block classifier classifies a particular pixel block as a low-activity block if the absolute sum of the predicted AC coefficients in the corresponding partial transform-coefficient block is less than the threshold, and, if not, classifies the particular pixel block as a high-activity block.

11. The apparatus of claim 10, wherein the low-ass filter of the first strength comprises a strong low-pass filter, and the given pixel region in a given low-activity pixel block to which the strong low-pass filter that is applied if a minimum condition for that pixel region is satisfied is boundary region pixels; and the low-pass filter of the second strength comprises a weak low-pass filter.

12. A machine-readable medium having a program of instructions for directing a machine to perform processing for reducing artifacts in digital data, the program of instructions comprising instructions for:
   (a) obtaining a reconstructed block-based pixel representation of the digital data;
   (b) extracting a DC coefficient for each block in the pixel representation based on values of selected pixels in that block to generate a map of DC coefficients;
   (c) for each pixel block, predicting a select number of lower frequency AC coefficients using the DC coefficient for that pixel block and a select number of neighboring DC coefficients in the DC coefficient map to construct a corresponding partial transform-coefficient block;
   (d) classifying each pixel block as a low-activity block or a high-activity block based on the predicted AC coefficients in the corresponding partial transform-coefficient block; and
   (e) selectively performing a low-pass filtering operation on select pixels in select pixel blocks on a block-by-block basis based on the classification of that block, the locations and values of predicted non-zero AC coefficients in the corresponding partial transform block, and certain pixel values in that block, wherein a low-pass filter of a first strength is applied to a given pixel region in a given low-activity block if a minimum condition for that pixel region is satisfied, and wherein a low-pass filter of a second strength is applied to a given pixel region in a given high-activity block if a minimum condition for that pixel region is satisfied.

13. The machine-readable medium of claim 12, wherein, in step (c), the five lowest frequency AC coefficients are predicted for each pixel block.

14. The machine-readable medium of claim 12, wherein the classifying of each pixel block in step (d) comprises comparing the absolute sum of the predicted AC coefficients in the corresponding partial transform block to a threshold.

15. The machine-readable medium of claim 14, wherein, in step (d), a particular pixel block is classified as a low-activity block if the absolute sum of the predicted AC coefficients in the corresponding partial transform-coefficient block is less than the threshold, and, if not, the particular pixel block is classified as a high-activity block.

16. The machine-readable medium of claim 15, wherein, in step (e), the low-pass filter of the first strength comprises a strong low-pass filter, and the given pixel region in a given low-activity block to which the strong low-pass filter is applied if a minimum condition for that pixel region is satisfied is boundary region pixels; and the low-pass filter of the second strength comprises a weak low-pass filter.

17. The machine-readable medium of claim 16, wherein, for each low-activity block, the strong low-pass filter is applied to
   smooth boundary region pixels in both the horizontal and vertical directions if all of the predicted AC coefficients in the corresponding partial transform-coefficient block have absolute values less than a predetermined value;
   smooth boundary region pixels in the vertical direction if at least one AC coefficient in a first select location in the corresponding partial transform-coefficient block has an absolute value greater than or equal to the predetermined value; and
   smooth boundary region pixels in the horizontal direction if at least one AC coefficient in a second location in the corresponding partial transform-coefficient block has an absolute value greater than or equal to the predetermined value.

18. The machine-readable medium of claim 17, wherein, for each low-activity block, the strong low-pass filter is applied to a current boundary region pixel only when a difference between a maximum pixel value and a minimum pixel value among a predetermined number of pixels centered on the current boundary region pixel is less than a predetermined parameter.

19. The machine-readable medium of claim 16, wherein, for each high-activity block, the weak low-pass filter is applied to smooth pixels inside the block in the horizontal direction if a difference between values of a first two adjacent pixels and a difference between values of a second two adjacent pixels are both less than a predetermined parameter and is applied to smooth pixels inside the block in the vertical direction if a difference between values of a third two adjacent pixels and a difference between values of a fourth two adjacent pixels are both less than the predetermined parameter.

* * * * *

UNITED STATES PATENT AND TRADEMARK OFFICE
CERTIFICATE OF CORRECTION

PATENT NO. : 6,983,079 B2 Page 1 of 1
APPLICATION NO. : 10/037767
DATED : January 3, 2006
INVENTOR(S) : Changick Kim It is certified that error appears in the above-identified patent and that said Letters Patent is hereby corrected as shown below:

<u>Title Page,</u> Item (56), References Cited, U.S. Patent Documents, add:

--6,240,135  5/2001  Kim 6,229,929  5/2001  Lynch et al.

6,188,799  2/2001  Tan et al.

6,151,420  11/2000  Wober et al.

6,115,503  9/2000  Kaup 6,028,967  2/2000  Kim et al.

5,937,101  8/1999  Jeon et al.

5,454,051  9/1995  Smith--

Title page, Item (56), under Foreign Pat. Documents add:
--WO 00/33254      6/8/00     WIPO--

Signed and Sealed this

Thirteenth Day of March, 2007

JON W. DUDAS
*Director of the United States Patent and Trademark Office*